United States Patent [19]
Yetter

[11] 3,797,125
[45] Mar. 19, 1974

[54] LEVELS AND LEVEL DETERMINING DEVICES

[76] Inventor: Harry G. Yetter, Colchester, Ill. 62326

[22] Filed: Sept. 2, 1971

[21] Appl. No.: 177,505

Related U.S. Application Data

[63] Continuation of Ser. No. 884,943, Dec. 15, 1969, abandoned.

[52] U.S. Cl. ............................................... 33/387
[51] Int. Cl. ............................................. G01c 9/28
[58] Field of Search ............ 33/384, 385, 386, 387, 33/388, 149 R, 149 H, 152 B, 156 A

[56] References Cited
UNITED STATES PATENTS

| 35,298 | 5/1862 | Cahoon | 33/88 |
| 52,579 | 2/1866 | Ledig | 33/387 |
| 662,925 | 12/1900 | Fierbaugh | 33/388 X |
| 1,141,617 | 6/1915 | Creamer | 33/387 |
| 1,633,854 | 6/1927 | Frantz | 33/387 X |

FOREIGN PATENTS OR APPLICATIONS

| 28,662 | 7/1903 | Switzerland | 33/156 A |
| 119,289 | 9/1918 | Great Britain | 33/387 |
| 514,479 | 3/1921 | France | 33/387 |

*Primary Examiner*—Samuel B. Rothberg
*Assistant Examiner*—Charles E. Phillips
*Attorney, Agent, or Firm*—Mann, Brown, McWilliams & Bradway

[57] ABSTRACT

An elogated base provided with upstanding side flanges or walls throughout its length pivotally mounting thereon a substantially correspondingly formed and sized body in parallel relation thereto having a right angularly and normally vertically disposed adjusting screw threadedly engaged with and through one free end portion bearing on an adjacent portion of the base bottom, a pointer-finger on and extended from one end of the pivotal body cooperable with a calibrated upstanding panel on the corresponding end portion of the base, and a spirit level vial fixedly seated on and disposed longitudinally of said body.

1 Claim, 6 Drawing Figures

PATENTED MAR 19 1974 3,797,125
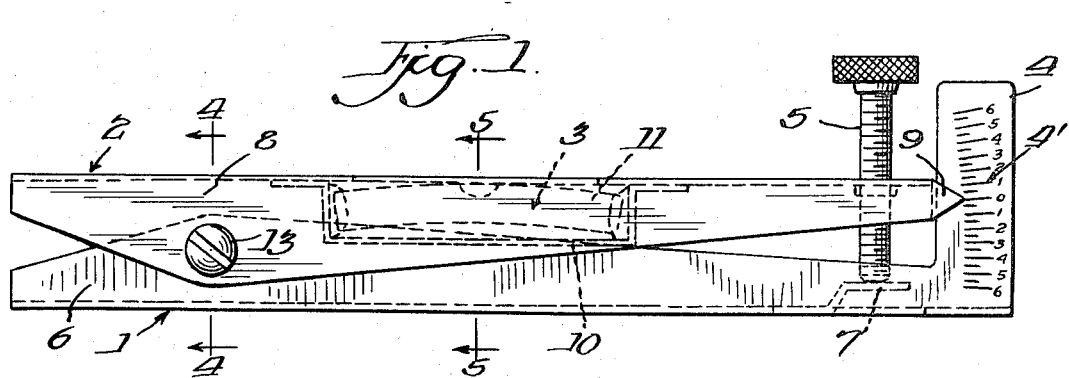
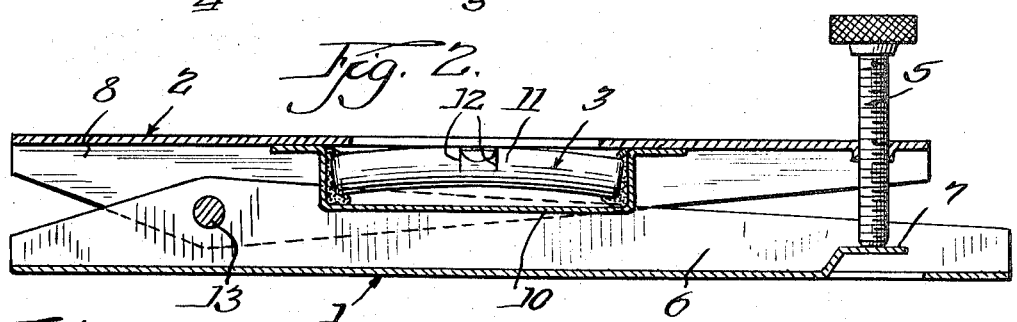
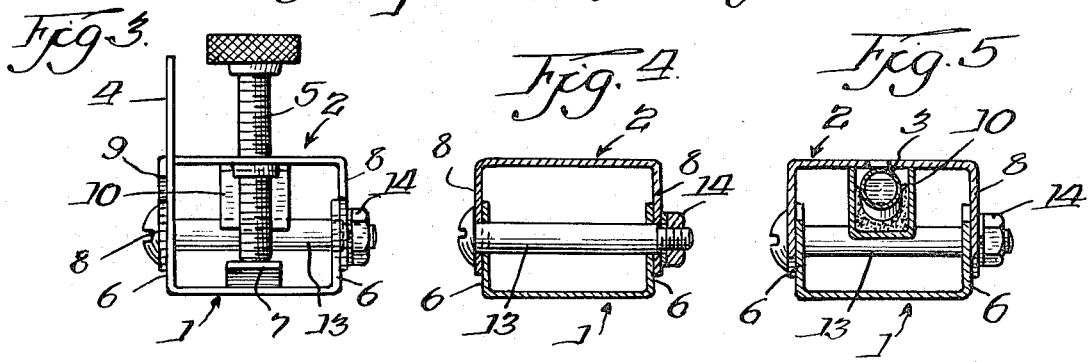
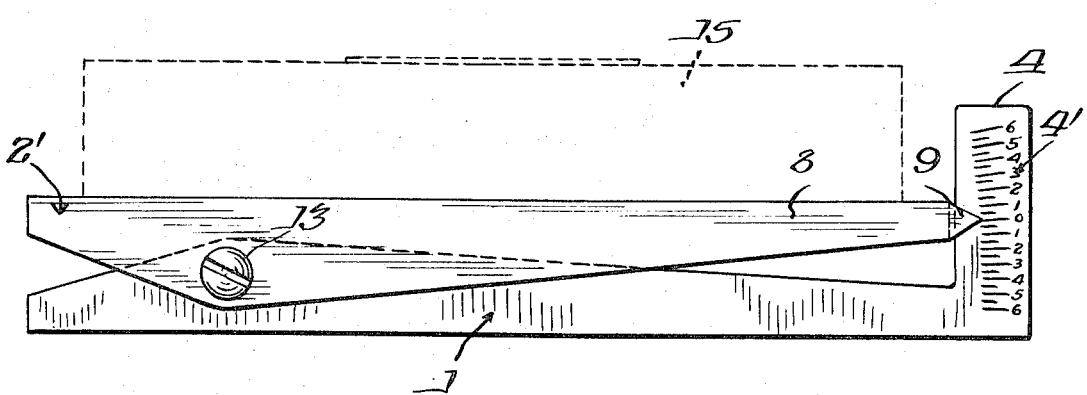
Inventor.
Harry G. Yeller.
By. W. T. Kellogg.
Atty.

LEVELS AND LEVEL DETERMINING DEVICES

This is a continuation of application Ser. No. 884,943, filed Dec. 15, 1969, now abandoned.

FIELD OF THE INVENTION

It is generally understood that in setting up so-called trailer camps the terrain surface is, more often, rough and uneven; that it is extremely difficult to effect a level positioning or parking of a trailer and hence, its floor. Without such occupant comfort plus satisfactory operation of the trailer equipped utilities, i.e., power operated refrigerators, liquid and gas fuel stoves, electric generators, etc., is prevented.

DESCRIPTION OF THE PRIOR ART

To effect, correct or remedy the aforesaid and similar difficulties, a number of devices and means (some complex and relatively costly) have been developed and used, but without satisfactory results.

SUMMARY OF THE INVENTION

The primary object of my invention is to provide a device by means of which a user will be enabled to quickly and accurately determine and adjust or effect level placement of a trailer or other body, including its floor and contained utilities, to and in horizontal planes or positions.

It is also an object of the invention to provide a combined level and level determining device by means of which a level supported surface will be visually computed, indicated, and quickly and simply attainable.

Yet another object of the invention is to provide a device of the stated character which when leveling usage has been attained, may be secured in the level computation indicated position.

A further object of the invention is to provide a combined level and level determining device capable of use in the attainment and providing of horizontal supporting, both longitudinally and transversly of a trailer or other body.

The invention also aims to provide other objects which will be in part obvious and in part pointed out hereinafter.

Satisfactory embodiments of the invention are now described with reference to the accompanying drawings, wherein,

BRIEF DESCRIPTION OF THE DRAWINGS

FIG. 1 is a side elevation of the combined level and level computing and determining device.

FIG. 2 is a vertical longitudinal section therethrough.

FIG. 3 is an end view thereof.

FIG. 4 is a transverse section taken on the line 4—4 of FIG. 1 looking in the direction in which the arrows point.

FIG. 5 is a like section taken on the line 5—5 of FIG. 1 looking in the direction in which the arrows point, and, FIG. 6 is a side elevation of a modified form of the invention wherein the pivotally mounted body receives an ordinary spirit level thereon.

Referring to that form of the invention shown in the FIGS. 1 through 5 and continuing the detailed description, the invention, generally, comprises an elongated base 1, a body 2 pivotally mounted thereon carrying an intermediately positioned spirit level 3, a substantially right-angularly disposed and up-standing calibrated panel 4, and a vertically disposed adjusting screw 5 threadedly engaged with and through that free end portion of the body in proximity to the panel 4, all hereinafter more fully described.

The elongated substantially oblong shaped base 1 is formed or otherwise provided with upstanding relatively opposed side walls 6, one of which fixedly carries the upstanding calibrated panel 4. An upwardly spaced horizontal bearing ear 7 is struck from that end portion of the base bottom directly below the lower end of the adjusting screw 5 and is normally bearingly engaged thereby, as shown in the FIGS. 1, 2 and 3.

The body 2 like the base 1, is substantially oblong in shape, formed or otherwise provided with downwardly disposed side walls 8 throughout its length, one of which has a pointer-finger 9 extended therefrom normally overlying the calibrated panel 4 (see FIG. 1) and cooperable with the calibrations 4' thereon.

To visually mount the spirit level 3 on the body 2, a window of appropriate shape and size is formed in and intermediately thereof (see FIGS. 1, 2 and 5). A receptacle 10 is positioned directly under said window and suitably secured to the body underside, receiving and retaining a suitably anchored bubble vial 11, the upper or exposed side of which is provided with relatively spaced and transversely disposed center lines, as at 12. The lines 12, with the vial bubble positioned therebetween as shown in the drawings, indicates that the surface or floor on which the level is positioned is level. However, when not level, the bubble will be positioned beyond said lines (either one side or the other) indicating the extent (inches, etc.) to which a parked trailer must be raised or lowered in order that it, its floor and the contained utilities must be raised or lowered in order to be made level.

To effect the centering of the bubble between the lines 12 on the vial, the adjusting screw is turned in that direction which will cause pivotal movement of the body 2 upwardly or downwardly, as required, to cause centering of said bubble. At such time, the pointer-finger 9 will be positioned adjacent one of the calibrations 4' which will indicate the extent in inches which the trailer and its floor must be raised or lowered to be made level.

The width of the body 2 is such that it will have snug though movable capping-like engagement over the base 1 when positioned atop the same. To effect its pivotal mounting on the base, a bolt 13 is engaged through the overlapping walls 6 and 8, preferably in proximity to that end of the device opposite the panel 4 and adjusting screw 5 and secured by engaging a nut and washer collectively indicated by the reference numeral 14.

In the FIG. 6 of the invention, I have shown a slightly modified form thereof wherein the pivotally mounted body 2' is formed with a plane and solid top surface adopted to receive a conventional type of spirit level indicated by the numeral 15 (same shown in dotted lines), and the vertically disposed adjusting screw 5 has been eliminated, as has the bearing ear 7 of the first illustrated and described embodiment of the invention.

It is believed that the mode of usage of the invention is manifest. However, in usage the base 1 is placed on a vehicle or other object which is to be leveled. If the vial bubble is positioned beyond the aforesaid center lines 12, the adjusting screw 5 is turned in a direction to effect raising or lowering of the pivotally mounted body 2 in a direction to cause the vial bubble to be center positioned between said guide lines, indicating leveling. When a level position of said body has been attained (with the vial bubble between the lines 12) the pointer-finger 9 will be positioned adjacent one of the calibrations 4' on the panel 4. These calibrations being translatable into inches or half inches, will indicate to the user the extent — in inches — the trailer must be raised or lowered to become level. Thereupon blocks of suitable measurement are placed under one or more of its wheels, thus assuring their firm and level support, particularly, transversly of its longitudinal axis.

I claim:

1. A combined level and level area determining device comprising:
   a. an elongated base formed of one-piece substantially U-shaped cross-sectional form having upwardly flanged side walls and said base including a screw bearing portion formed integrally with the base portion connecting said side walls,
   b. a vertically disposed panel integral with and extending upwardly from adjacent one end of one of said side walls having a calibrated dial thereon,
   c. an inverted elongated body of one-piece substantially U-shaped cross-sectional form having a top wall and spaced depending side walls engaged over said upwardly flanged side walls of said base,
   d. pivot mounting means pivotally securing said depending side walls to said upwardly flanged side walls intermediate of the ends of the body member,
   e. a spirit level mounted in said top wall,
   f. a pointer integral with one of said depending said walls extending beyond such side wall in overlapping relation to said vertically disposed panel and in indicating relationship with said calibrated dial,
   g. and an adjusting screw threaded through a wall of said body and engaging said bearing formed integrally with said base portion to position the body in adjusted relation to the base,
   h. said pivot mounting means being located inwardly of one end of said base and said body, and said upwardly flanged side walls and said depending side walls being tapered from adjacent said pivot mounting means to said one end whereby to provide clearance for relative pivoting of the base and body members.

* * * * *

UNITED STATES PATENT OFFICE
CERTIFICATE OF CORRECTION

Patent No. 3,797,125    Dated March 19, 1974

Inventor(s) Harry G. Yetter

It is certified that error appears in the above-identified patent and that said Letters Patent are hereby corrected as shown below:

Column 4, line 9, "said", second occurrence, should read -- side --.

Signed and sealed this 17th day of September 1974.

(SEAL)
Attest:

McCOY M. GIBSON JR.
Attesting Officer

C. MARSHALL DANN
Commissioner of Patents